United States Patent [19]

Kataoka

[11] Patent Number: 4,748,850
[45] Date of Patent: Jun. 7, 1988

[54] APPARATUS FOR EVALUATING THE SLIPPAGE OF A MECHANICAL SEAL

[75] Inventor: Tadashi Kataoka, Yokohama, Japan

[73] Assignees: Agency of Industrial Science and Technology; Ministry of International Trade and Industry, both of Tokyo, Japan

[21] Appl. No.: 18,444

[22] Filed: Feb. 25, 1987

[30] Foreign Application Priority Data

Mar. 28, 1986 [JP] Japan .................................. 61-68611

[51] Int. Cl.$^4$ .......................................... G01M 19/00
[52] U.S. Cl. ...................................................... 73/660
[58] Field of Search .......................... 73/660, 579, 593; 364/508

[56] References Cited

U.S. PATENT DOCUMENTS 3,034,043  5/1962  Dega .................................. 73/660 X
4,615,216 10/1986  Vykoupil ........................... 73/660 X

FOREIGN PATENT DOCUMENTS 55-98353  7/1980  Japan .

Primary Examiner—Jerry W. Myracle
Attorney, Agent, or Firm—Oblon, Fisher, Spivak, McClelland & Maier

[57] ABSTRACT

The invention relates to an apparatus for evaluating the slippage of a mechanical seal comprising: a high frequency vibration sensor, attached to the outside of the mechanical seal of a rotary machine equipped with the mechanical seal, for measuring the high frequency vibration which is generated by the mechanical seal in the operating mode; and a microcomputer for receiving the output of the high frequency vibration sensor, for analyzing the high frequency vibration which is generated by the mechanical seal in each state of the slippage surfaces of the mechanical seal, and for outputting the evaluation value of the slippage of the mechanical seal.

4 Claims, 5 Drawing Sheets

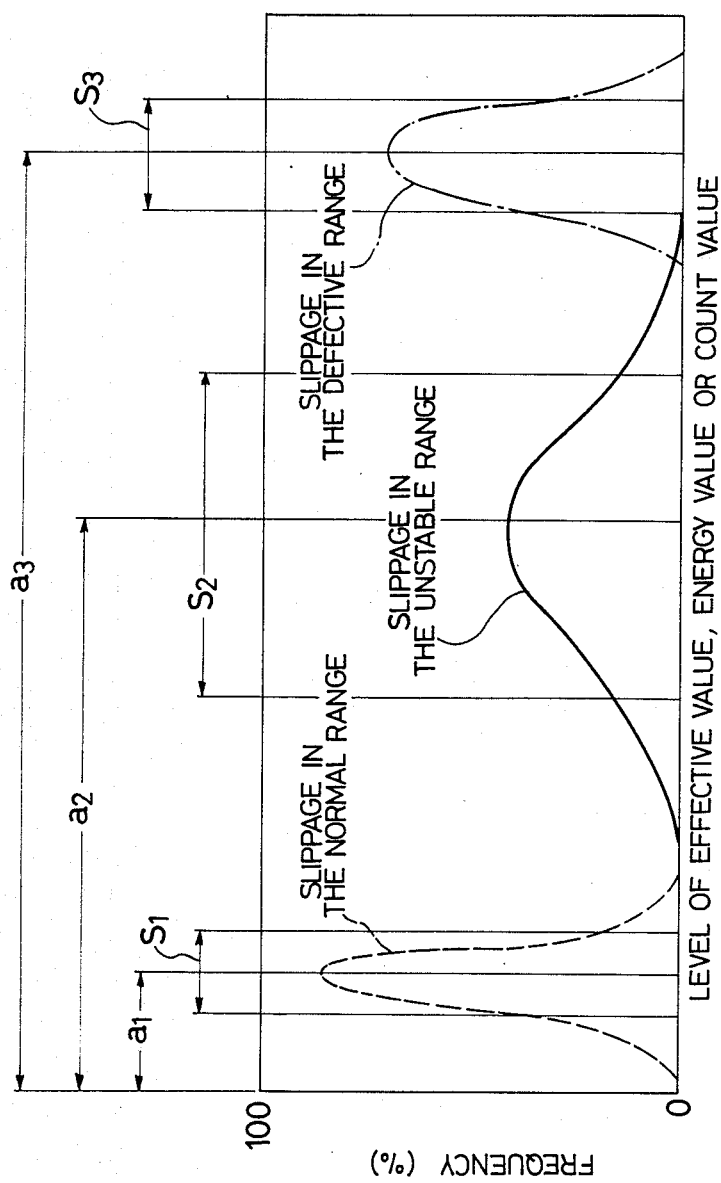

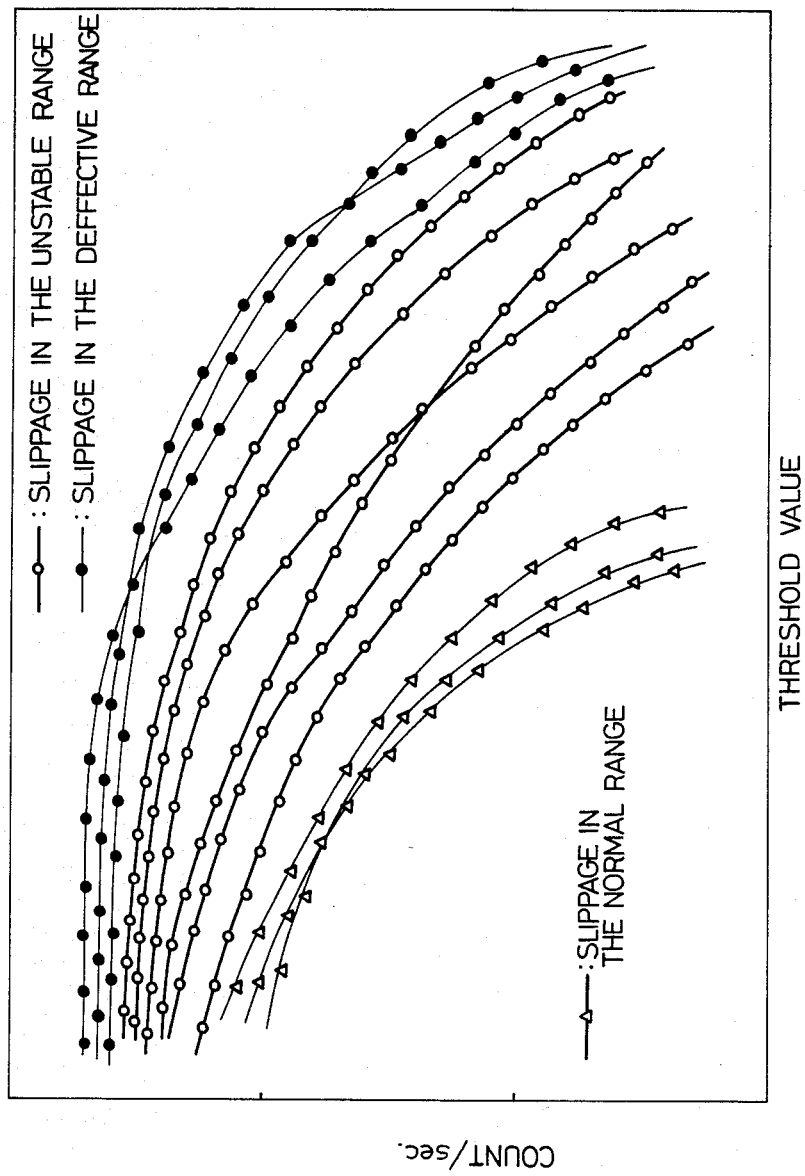

APPARATUS FOR EVALUATING THE SLIPPAGE OF A MECHANICAL SEAL

FIELD OF THE INVENTION

The present invention relates to a mechanical seal and, more particularly, to method and apparatus for judging the slippage of a mechanical seal.

DESCRIPTION OF THE RELATED BACKGROUND ART

Mechanical seals are often used in the shaft sealing apparatus of rotary machines to convey fluids. However, despite the fact that mechanical seals have an extremely high probability of failure compared with other mechanical elements, the occurrence of the abnormal condition cannot be detected until leakage actually occurs. Failure is difficult to predict.

Hitherto, there has been proposed a method whereby a high frequency vibration sensor is attached to the member subject to slippage (on the fixed side) of the rotaty machine and the high frequency vibration which is generated by the slippage is detected, thereby detecting the abnormal condition of the member subject to slippage (Japanese Patent Disclosure No. 55-98353). However, according to this method, the occurrence of an abnormal condition is simply detected by comparing the magnitude of the amplitude of the detected waveform. Therefore, for example, this method is effective to distinguish between the state of contact or noncontact between the balance disk and the balance sheet, between the labyrinth seal and the shaft, and the like. However, it is impossible to check and evaluate the state of constant contact and slippage such as in a mechanical seal.

There has also been proposed a method whereby the vibration of the mechanical seal is measured by a vibration sensor having sensitivity in the relatively low frequency band, and thereby evaluating the slippage of the mechanical seal. However, according to this method, the vibration sensor is easily influenced by the noise of the bearings, fluid sounds, and other sources, other than the mechanical seal, so that the slippage of the mechanical seal cannot be sufficiently evaluated.

SUMMARY OF THE INVENTION

It is an object of the present invention to provide an apparatus which can easily and absolutely evaluate the slippage of a mechanical seal in the operating mode and predict failure of the mechanical seal.

The frequencies of the noise other than that of the mechanical seal which are generated by the bearings, fluid sounds, and other sources, fall within the low frequency band below 100 kHz. On the other hand, the frequencies of the vibration which is caused by the mechanical seal fall within the high frequency band of 100 kHz to 2 MHz.

The invention uses either a high frequency vibration sensor having a frequency sensitivity in the wide band of 100 kHz to 2 MHz, or a high frequency vibration sensor having a frequency sensitivity in the narrow band and having a resonant point within the range of 100 kHz to 2 MHz. Therefore, the effect of the noises excluding the noise which is caused by the mechanical seal can be reduced to negligible levels. The high frequency vibration which is caused by the mechanical seal can be absolutely detected by an extremely simple method whereby this high frequency vibration sensor is attached to the casing of the machine.

In the slippage of the mechanical seal, two contradictory functions are performed: one function seals the fluid, the other function prevents the abrasion of the material subject to slippage by the lubricating effect of the fluid. The life of a mechanical seal and the occurrence of failures are largely influenced by the condition and stability of the lubricating film. The high frequency vibration which is caused by the mechanical seal occurs due to the solid contact of the materials subject to slippage and is closely related to the condition of the lubricating film. As the lubricating film approaches the dry frictional state in which the lubricating film is broken, the amplitude of vibration increases and the vibration frequency also becomes high. In addition, the slippage of the mechanical seal is not always constant. If the condition of the lubricating film is unstable, the high frequency vibration which is caused by the mechanical seal fluctuates in accordance with its stability.

According to the invention, the vibration of extremely high frequencies which is generated by the mechanical seal is measured on the outside. One or more of the effective value of the output of the high frequency vibration sensor, the energy value, and the number of times that the amplitude of this output exceeds a predetermined threshold value for a unit of time are continuously measured. The magnitude of level of the value and the magnitude of fluctuation width for the unit of time, and the number of times that the amplitude of output of the high frequency vibration sensor exceeds the predetermined threshold value for the unit of time is measured by changing the threshold value, thereby obtaining and using an amplitude or similar distribution. Therefore, the condition and stability of the foregoing lubricating film can be clearly evaluated.

The above and other objects and features of the present invention will become apparent from the following detailed description and the appended claims with reference to the accompanying drawings.

BRIEF DESCRIPTION OF THE DRAWINGS

FIGS. 6 and 7 are evaluation diagrams showing the slippage of a mechanical seal.

DETAILED DESCRIPTION OF THE PREFERRED EMBODIMENT

Figure 1:
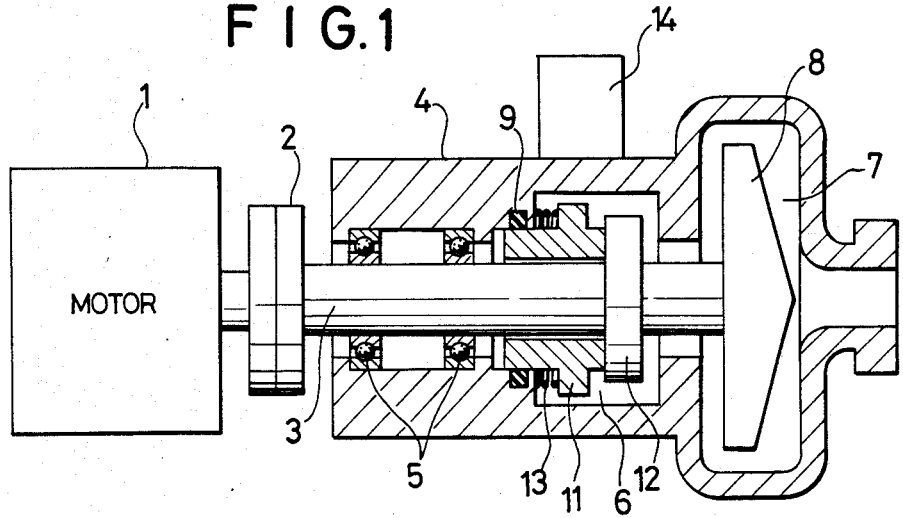
FIG. 1 is a vertical sectional view of an embodiment of the present invention.

An embodiment of the present invention will be described below with reference to the drawings. FIG. 1 is a vertical sectional view of a pump.

A pump shaft 3 coupled to the shaft of a motor 1 by a shaft coupling 2 is supported by a bearing 5 enclosed in a pump casing 4. The pump shaft 3 is sealed by a mechanical seal and a shaft sealing apparatus 6 such as an oil seal (not shown) and projected into a pump chamber 7. An impeller 8 is attached to one end portion of the pump shaft 3 in the pump chamber 7.

The mechanical seal is constituted by: a follower ring 11 which is sealed in the pump casing 4 by a seal ring 9 and is movable in the axial direction; a rotary ring 12, fixed to the pump shaft 3, which slips along the follower ring 11; and a spring 13 which is arranged between the follower ring 11 and the pump casing 4 and presses the follower ring 11 toward the rotary ring 12 in the axial direction. Those components constituting the mechanical seal are substantially positioned in the fluid which serves to both cool and lubricate. A rotation stop means may be also provided in order to prevent the follower ring 11 from rotating. A high frequency vibration sensor 14 is attached to the pump casing 4.

Figure 2:
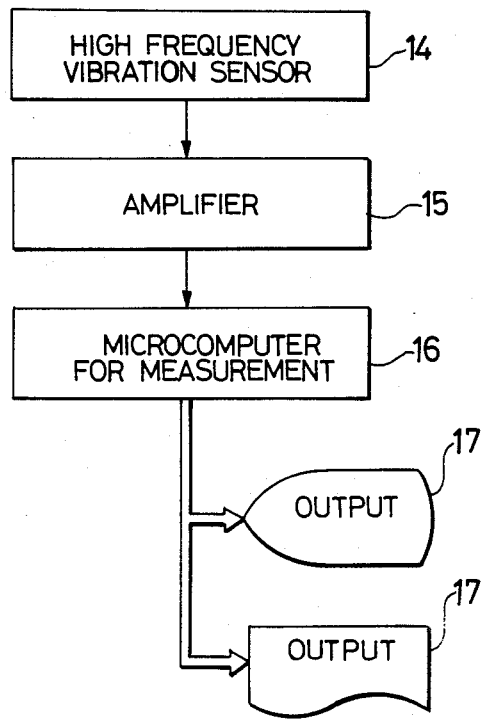
FIG. 2 is a control block diagram.

FIG. 2 is a block diagram. The vibration waveform of the mechanical seal which is detected by the sensor 14 attached to the pump casing 4 is amplified by an amplifier 15 and input to a microcomputer 16 for measurement and arithmetically operated. The result of the arithmetic operation is output to an output display apparatus 17 and displayed.

In order to reduce the effect of the noises which are generated by the bearings, fluid sound, and other sources, other than by the mechanical seal, it should be noted that the frequencies of these noises fall within a relatively low frequency band below 100 kHz. Thus either of the following types of high frequency vibration sensors 14 is used: a wide band type sensor having frequency sensitivity in the wide band of 100 kHz to 2 MHz; or a resonant type sensor having frequency sensitivity in the narrow band and a resonant point within the frequency range of 100 kHz to 2 MHz.

Figure 3:
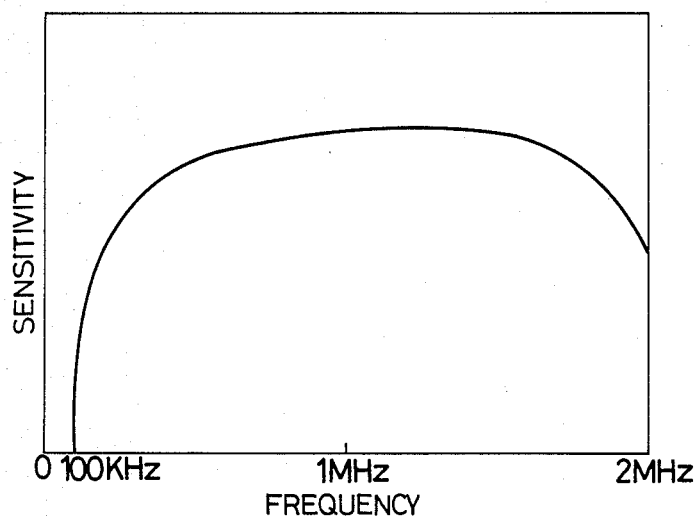
FIGS. 3 and 4 are graphs showing the sensitivity of a high frequency vibration sensor.
Figure 4:
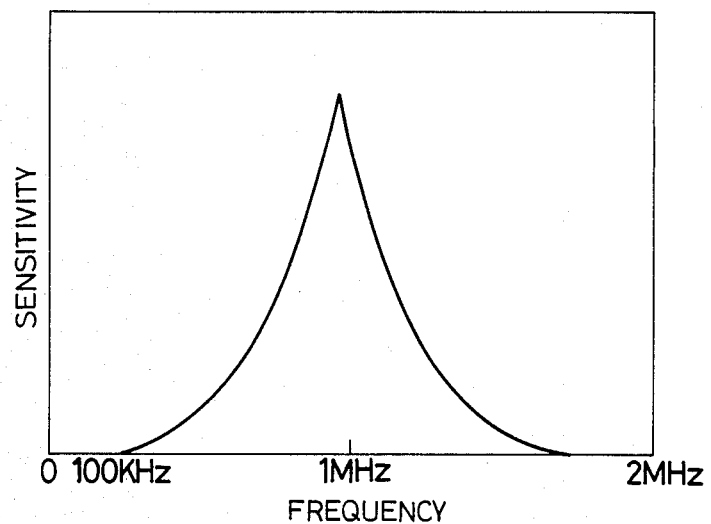

FIG. 3 is a graph showing an example of the frequency sensitivity of the wide band type sensor 14. FIG. 4 is a graph showing an example of the frequency sensitivity of the resonant type sensor 14.

The microcomputer 16 reads out the detection output of the sensor 14 and converts it into a digital signal by a high speed A/D converter, thereby performing various kinds of arithmetic operations and evaluations on the basis of the digital signals. The calculations of the effective and other values need not be executed by the microcomputer 16. It is also possible to use a method whereby the output of the sensor 14 is supplied to an effective value voltmeter or similar apparatus, and its output is read by the microcomputer 16.

Figure 5:
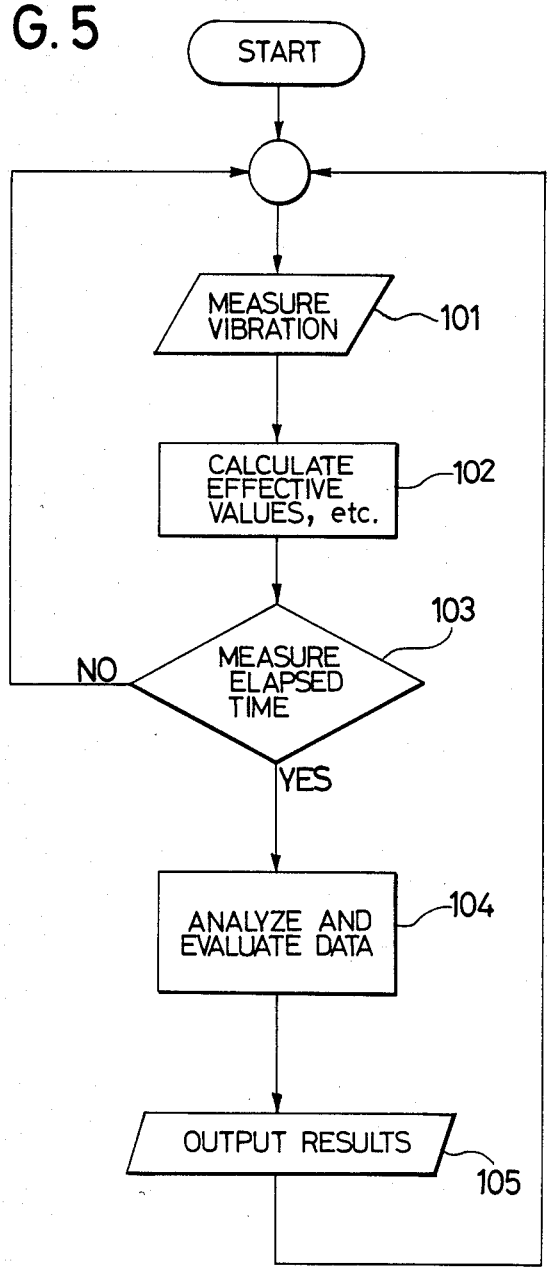
FIG. 5 is a flowchart explaining the operation of an apparatus according to the invention.

An example of the operation of the apparatus according to the invention will be described with reference to the flowchart of FIG. 5.

When the motor 1 is operated, the pump shaft 3 rotates through the shaft coupling 2 and the fluid is sucked in by the impeller 8 and its pressure and speed are increased. Thereafter, the fluid is emitted at a high pressure and speed. The rotary ring 12 and follower ring 11 slip with each other. The natural vibration which is generated by the slippage of the rotary ring 12 and follower ring 11 is transmitted in the casing 4 without being substantially attenuated and is detected by the sensor 14.

When the system starts operating, in step 101, the high frequency vibration which is generated from the slippage surfaces of the rings 12 and 11 is measured by the sensor 14 and amplified by the amplifier 15. In step 102, the amplified signal is input to the microcomputer 16 and A/D converted, one of the effective value, the energy value, and the number of times that the amplitude of the output exceeds a predetermined threshold value over a unit of time is obtained and sequentially stored. In step 103, a check is made to determine whether the time required for the above calculations has elapsed a predetermined time. The operations in steps 101 to 103 are repeated until the foregoing predetermined time elapses. The data obtained are statistically analyzed in step 104. In step 105, the results of the evaluation of the data and the slippage of the mechanical seal are output to the output display apparatus 17 and displayed by, for example, display, printer or plotter. The operations in steps 101 to 105 are repeated.

FIG. 6 shows an example of an analysis of the data of the high frequency vibration and an example of a method of evaluating the slippage surfaces of the mechanical seal on the basis of the analyzed data. FIG. 6 shows the frequency distribution of data which were continuously measured for a fixed period of time. In FIG. 6, the axis of abscissas denotes one of the effective value of the high frequency vibration, the energy value, and the number of times that the amplitude of the output exceeds a predetermined threshold value for a unit of time, and the axis of ordinates represents the frequency of the data. In the graph, the broken line represents the case where good lubricating films are formed on the slippage surfaces, the solid line represents the case where the lubricating films are unstably formed, and the dot-dash line denotes the case where the lubricating films are insufficiently formed and the slippage surfaces are close to the dry frictional state. The average values and deviations in each of the above cases are indicated by $a_1$ to $a_3$ and $s_1$ to $s_3$ respectively, in FIG. 6. The states of the slippage surfaces are quantitatively evaluated and displayed on the basis of those values.

FIG. 7 shows another evaluating method. FIG. 7 shows the amplitude distribution which is derived by counting the number of times that the amplitude of the output of the high frequency vibration sensor exceeds a predetermined threshold value for a unit of time by changing the threshold value. In FIG. 7, Δ indicates the case where good lubricating films are formed on the slippage surfaces, ○ represents the case where the lubricating films are unstably formed, and ● denotes the case where the lubricating films are insufficiently formed and the slippage surfaces are close to the dry frictional state. Even by this evaluation method, the states of the slippage surfaces can be also clearly distinguished.

According to the present invention, an apparatus for evaluating the slippage of a mechanical seal comprises: a high frequency vibration sensor, attached to the outside of the mechanical seal of a rotary machine equipped with the mechanical seal, for measuring the high frequency vibration which is generated by the mechanical seal in the operating mode; and a microcomputer for receiving the output of the sensor, for analyzing the high frequency vibration which is generated by the mechanical seal in each state of the slippage surfaces of the mechanical seal, and for outputting the evaluation values of the slippage of the mechanical seal. Therefore, the states of the slippage surfaces of the mechanical state can be detected at any time from the beginning of the use of the mechanical seal until it cannot no longer be used because of abrasion.

According to the invention, since the sensor is attached to the outside of the casing of the machine, the high frequency vibration which is generated by the mechanical seal can be absolutely detected by an extremely simple method.

According to the invention, the vibration of extremely high frequencies which is generated by the mechanical seal is measured. One or more of the effective value of the output of the high frequency vibration sensor, the energy value, and the number of times that the amplitude of the output exceeds a predetermined threshold value for a unit of time can be continuously measured. The magnitude of level of the values and the magnitude of the variation width in the unit of time, and the number of times that the amplitude of the output of the high frequency vibration sensor exceeds the predetermined threshold value for the unit of time can be measured by changing the threshold value, thereby obtaining an amplitude or similar distribution. The resultant amplitude or similar distribution is used. As a result, the condition and stability of the lubricating film of the slippage surfaces of the mechanical seal can be evaluated.

With this invention, the slippage of the mechanical seal in the operating mode can be evaluated, so that failure of the mechanical seal can be predicted.

The present invention is not limited to the foregoing embodiment, and other modifications and variations are possible within the spirit and scope of the appended claims of the invention.

What is claimed is:

1. An apparatus for evaluating the sliding state or state of a mechanical seal comprising:

a high frequency vibration sensor, attached on the casing of a rotary machine equipped with the mechanical seal, for measuring a high frequency vibration such as the acoustic emission which is generated by the mechanical seal in the operating mode; and a computer for receiving the output of said sensor, for analyzing the high frequency vibration which is generated by the mechanical seal in each state of the sliding surfaces of the mechanical seal, and for outputting evaluation values of the state of the mechanical seal.

2. An apparatus according to claim 1, wherein the frequency sensitivity of said high frequency vibration sensor is set to a wide band type of 100 kHz to 2 MHz or to narrow band type having a resonant point within a range of 100 kHz to 2 MHz, and wherein further the frequency sensitivity below 100 kHz is cut by use of a high pass filter as necessary, thereby essentially detecting high frequency vibration above 100 kHz.

3. An apparatus according to claim 1 or 2; wherein said computer continuously calculates root mean square value, the energy value of the output of said high frequency vibration sensor or the number of times that the amplitude of said output exceeds a predetermined threshold value for a unit of time, and wherein said computer evaluates the magnitude of the level of said value and the magnitude of the variation width in the unit of time.

4. An apparatus according to claim 1 or 2, wherein said computer counts the number of times that the amplitude of the output of said high frequency vibration sensor exceeds a predetermined threshold value for a unit of time by changing said threshold value, thereby obtaining an amplitude distribution.

* * * * *

UNITED STATES PATENT AND TRADEMARK OFFICE
CERTIFICATE OF CORRECTION

PATENT NO. : 4,748,850
DATED : Jun. 7, 1988
INVENTOR(S) : Tadashi KATAOKA

It is certified that error appears in the above-identified patent and that said Letters Patent is hereby corrected as shown below:

On the Title Page, Item [73] Assignee:

The words --extra-ministerial bureau of-- are inserted before "Ministry".

The words "both of" are deleted.

Signed and Sealed this

Twenty-fifth Day of July, 1989

Attest:

DONALD J. QUIGG

Attesting Officer

Commissioner of Patents and Trademarks